United States Patent
Shah et al.

(10) Patent No.: US 9,251,806 B2
(45) Date of Patent: Feb. 2, 2016

(54) MOBILE PHONE WITH VARIABLE ENERGY CONSUMING SPEECH RECOGNITION MODULE

(71) Applicant: INTEL CORPORATION, Santa Clara, CA (US)

(72) Inventors: Saurin Shah, Portland, OR (US); Brian W. Bramlett, Portland, OR (US); Saurabh Dadu, Tigard, OR (US); Swarnendu Kar, Hillsboro, OR (US); Brian K. Vogel, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 118 days.

(21) Appl. No.: 14/127,094

(22) PCT Filed: Sep. 5, 2013

(86) PCT No.: PCT/US2013/058243
§ 371 (c)(1),
(2) Date: Dec. 17, 2013

(87) PCT Pub. No.: WO2015/034504
PCT Pub. Date: Mar. 12, 2015

(65) Prior Publication Data
US 2015/0065199 A1    Mar. 5, 2015

(51) Int. Cl.
*H04W 52/02* (2009.01)
*G10L 21/0208* (2013.01)

(52) U.S. Cl.
CPC ......... *G10L 21/0208* (2013.01); *H04W 52/028* (2013.01); *H04W 52/0254* (2013.01); *G10L 2021/02082* (2013.01)

(58) Field of Classification Search
CPC ....... G10L 15/00; G10L 15/005; G10L 15/01; G10L 15/02; G10L 15/08; G10L 15/10; G10L 15/20; G10L 15/22; G10L 15/28; G10L 15/26; G10L 15/24; G10L 2015/221; G10L 2015/223; G10L 2015/225
USPC ........ 455/563, 508, 501, 41.2, 41.1, 41.3, 60, 455/63.1, 67.13, 72, 76, 79, 570, 135; 704/233, 215, 216, 217, 218, 240, 227, 704/201, 226, 246; 379/406.03, 88.04, 379/88.07, 406.01, 406.08, 406.06, 88.22; 370/286, 290; 725/92; 381/110; 348/14.08
See application file for complete search history.

(56) References Cited

U.S. PATENT DOCUMENTS 6,522,746 B1 *   2/2003   Marchok et al. ......... 379/406.03
6,580,696 B1 *   6/2003   Chen et al. .................... 370/286

(Continued)

OTHER PUBLICATIONS

International Search Report and Written Opinion mailed May 28, 2014 for International Application No. PCT/US2013/058243, 14 pages.

*Primary Examiner* — Tan H Trinh
(74) *Attorney, Agent, or Firm* — Schwabe, Williamson & Wyatt, P.C.

(57) ABSTRACT

Apparatus, computer-readable storage medium, and method associated with speech recognition are described. In embodiments, a mobile phone may include a processor; and a speech recognition module coupled with the processor. The voice recognition module may be configured to recognize one or more voice commands and may include first echo cancellation logic and second echo cancellation logic to be selectively employed during recognition of voice commands. Employment of the first and second echo cancellation logic respectively may cause the mobile phone to variably consume a first and second amount of energy, with the second amount of energy being less than the first amount energy.

22 Claims, 3 Drawing Sheets

(56) References Cited

U.S. PATENT DOCUMENTS

| | | | |
|---|---|---|---|
| 8,094,838 B2* | 1/2012 | Jacoby et al. | 381/110 |
| 8,175,871 B2* | 5/2012 | Wang et al. | 704/227 |
| 8,929,517 B1* | 1/2015 | Lavian et al. | 379/88.11 |
| 8,954,324 B2* | 2/2015 | Wang et al. | 704/233 |
| 9,001,994 B1* | 4/2015 | Yang | H04B 3/237 379/406.08 |
| 2005/0053230 A1* | 3/2005 | Gierachf | H04M 9/082 379/406.06 |
| 2005/0203737 A1* | 9/2005 | Miyazaki | 704/240 |
| 2007/0041361 A1 | 2/2007 | Iso-Sipila | |
| 2008/0114597 A1 | 5/2008 | Parpov | |
| 2009/0089054 A1* | 4/2009 | Wang et al. | 704/233 |
| 2010/0014690 A1 | 1/2010 | Wolff et al. | |
| 2012/0099722 A1 | 4/2012 | Taniguchi et al. | |
| 2012/0250852 A1* | 10/2012 | Rowley | 379/406.01 |
| 2013/0127980 A1* | 5/2013 | Haddick et al. | 348/14.08 |
| 2013/0141516 A1 | 6/2013 | Baldwin | |
| 2013/0216056 A1 | 8/2013 | Thyssen | |
| 2014/0278393 A1* | 9/2014 | Ivanov et al. | 704/233 |
| 2015/0065199 A1* | 3/2015 | Shah | H04W 52/0254 455/563 |

* cited by examiner

MOBILE PHONE WITH VARIABLE ENERGY CONSUMING SPEECH RECOGNITION MODULE

CROSS REFERENCE TO RELATED APPLICATIONS

The present application is a national phase entry under 35 U.S.C. §371 of International Application No. PCT/US2013/058243, filed Sep. 5, 2013, entitled "MOBILE PHONE WITH VARIABLE ENERGY CONSUMING SPEECH RECOGNITION MODULE", which designated, among the various States, the United States of America. The Specification of the PCT/US2013/058243 Application is hereby incorporated by reference.

TECHNICAL FIELD

Embodiments of the present disclosure are related to the field of mobile communication, and in particular, to mobile phones with variable energy consuming speech recognition module.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Speech recognition is becoming more widely used and accepted. In addition, mobile phones are becoming more abundant and more powerful. As a result of these advances, speech recognition capabilities on mobile phones continue to increase. Traditionally, however, speech recognition has been limited in use on mobile phones because of the energy consumed by the mobile phone in the speech recognition process as well as the ability of the speech recognition process to identify voice commands when other processes utilize the same audio stream necessary to identify the voice commands. Typically, this limits use of speech recognition to when the mobile phone is in a full power mode and when the audio stream necessary to identify the voice commands is free for the speech recognition process and not being utilized by other process of the mobile phone.

DETAILED DESCRIPTION OF ILLUSTRATIVE EMBODIMENTS

A method, storage medium, and apparatus, for voice command recognition are described. In embodiments, the apparatus may be a mobile phone. The mobile phone may include a processor and a speech recognition module coupled with the processor. The speech recognition module may be configured to recognize one or more voice commands and may include first and second echo cancellation logic to be selectively employed during recognition of voice commands. The first and second echo cancellation logic may cause the mobile phone to variably consume a first and second amount of energy, respectively, where the second amount of energy is less than the first amount. In embodiments, the one or more voice commands may selectively activate a private or group mode of a conversational user interface (CUI) while a user is engaged in a voice or video call.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
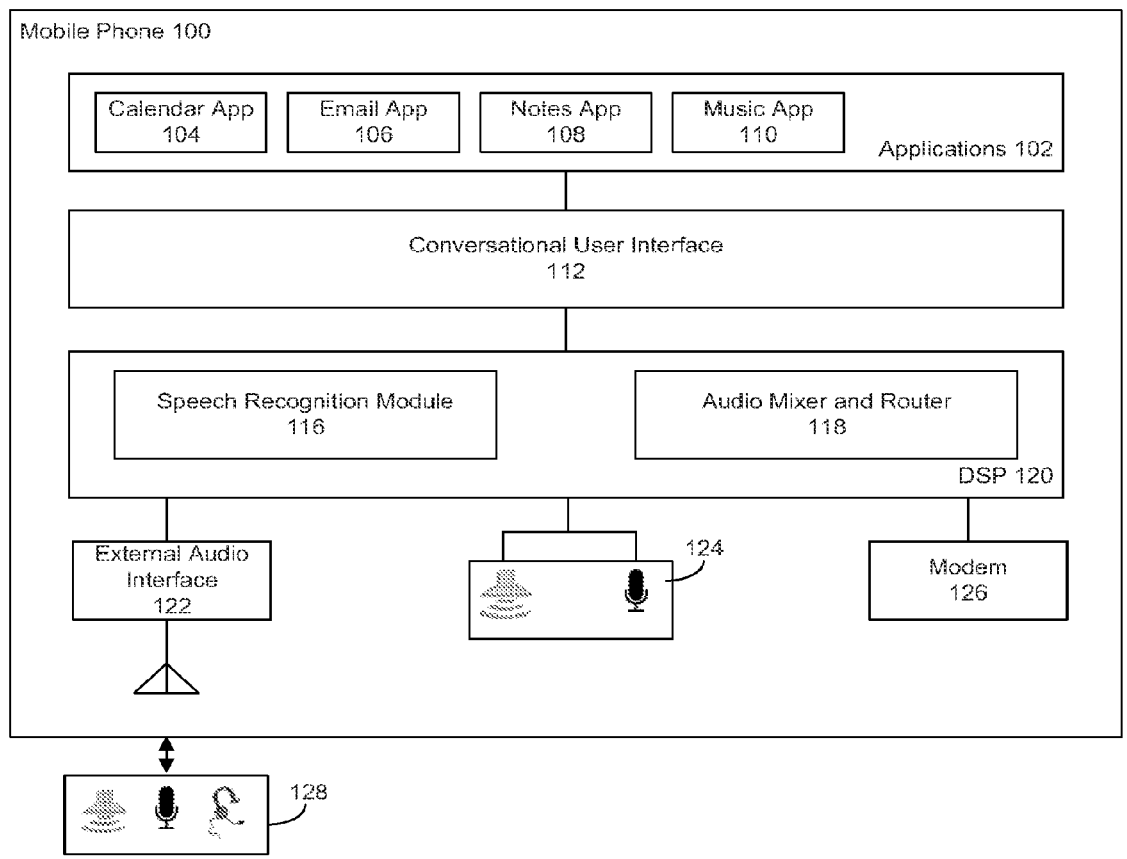
FIG. 1 depicts an illustrative representation of a mobile phone in which some embodiments of the present disclosure may be practiced.

FIG. 1 depicts an illustrative representation of a mobile phone 100 in which some embodiments of the present disclosure may be practiced. Mobile phone 100 may include applications 102, a conversational user interface (CUI) 112, a digital signal processor (DSP) 120, an external audio interface 122, one or more internal audio components 124, a modem 126 and one or more external audio components 128, selectively coupled with each other as shown.

DSP 120 may be coupled with external audio interface 122, the one or more internal audio components 124, modem 126, and CUI 112. External audio interface 122 may be coupled with the one or more external audio components 128. The connection coupling the external audio interface 122 and the one or more external audio components 128 may be wired or wireless. Both external audio components 128 and internal audio components 124 may include any type of audio component capable of capturing or producing audio, such as the audio components depicted in the corresponding boxes of FIG. 1.

Modem 126 may be configured to send and receive data over a network. In embodiments, modem 126 may be configured to enable a user of mobile device to engage in a voice call with one or more other participants over a telecommunications network, WiFi network, local area network (LAN), the internet, or other suitable network.

DSP 120 may include speech recognition module 116 and audio mixer and router 118. Audio mixer and router 118 may be configured to combine, or mix, individual audio streams from multiple sources and to route the individual audio streams and/or the combined audio streams to one or more receivers. For instance, when a user is in a voice call, the audio of the user's voice may be mixed with the audio of the other participants in the voice call and may be routed to a speaker, such as that depicted in 124 or 128.

Speech recognition module 116 may be configured to detect voice commands given by a user of mobile phone 100. In embodiments, speech recognition module may be configured to operate while the user is participating in a voice call on mobile phone 100. In these embodiments, audio mixer and router 118 may be configured to provide speech recognition module 116 with an audio stream from a microphone, such as that depicted in 124 or 128, in order to process the audio stream and detect any voice commands contained therein. Once a voice command is detected by speech recognition module 116, speech recognition module may be configured to cause a specific action associated with that voice command to occur. For instance, if the voice command is associated with activation of CUI 112, speech recognition module 116 may cause the audio mixer and router 118 to route the appropriate audio streams to CUI 112. In other embodiments, the routing of the audio stream may be carried out by speech recognition module 116 requesting the audio stream from audio mixer and router 118 and the forwarding that audio stream to CUI 112. In these embodiments, speech recognition module 116 may process the audio stream prior to forwarding the audio stream. This processing may be to detect additional voice commands or to prepare the audio stream for processing by the CUI 112, such as, for example, by performing echo cancellation on the stream such as that discussed below.

In embodiments, speech recognition module 116 may be configured to recognize a voice command associated with a private mode and a voice command associated with a group mode. In embodiments, the private mode may enable only the user to interact with CUI 112, whereas the group mode may enable other participants in a voice call with the user to participate in, or listen to, the interaction of the user with CUI 112. These embodiments are discussed in greater detail below in reference to FIGS. 2 and 4.

In embodiments, speech recognition module 116 may be configured to implement acoustic echo cancellation to attenuate sounds in audio streams provided to speech recognition module 116 by audio mixer and router 118. The acoustic echo cancellation may aid speech recognition module 116 in identifying voice commands by attenuating audio produced by mobile phone 100 from the audio stream thereby allowing speech recognition module to concentrate processing on the remaining audio in the audio stream. In these embodiments, speech recognition module may be configured with lightweight acoustic echo cancellation logic capable of performing sufficient echo cancellation while mobile phone 100 is in a low powered state and another echo cancellation for use when the phone is in a high powered state. These embodiments are discussed further in reference to FIG. 2 below.

CUI 112 may be configured to interface between speech recognition module 116 and applications 102. In some embodiments, CUI 112 may be configured to only become active when an audio stream is provided as input, such as an audio stream from the microphone depicted in either box 124 or 128. In some embodiments an audio stream may be provided to CUI 112 upon speech recognition module 116 detecting an associated voice command in the audio stream. Once an associated voice command is received speech recognition module may cause an audio stream to be provided to CUI 112, as discussed above. Once active, CUI 112 may be configured to interface between the user of mobile phone 100 and applications 102. For instance, a user may wish to draft an email utilizing CUI 112 and CUI 112 may provide email app 106 with commands corresponding to those detected by CUI 112 in the audio stream. As depicted here, CUI 112 may be configured to interact with calendar app 104, email app 106, notes app 108 and/or music app 110. It will be appreciated that these applications are for illustrative purposes only and that CUI 112 may be configured to interact with any type of application, including local or remote applications, without departing from the scope of this disclosure.

Figure 2:
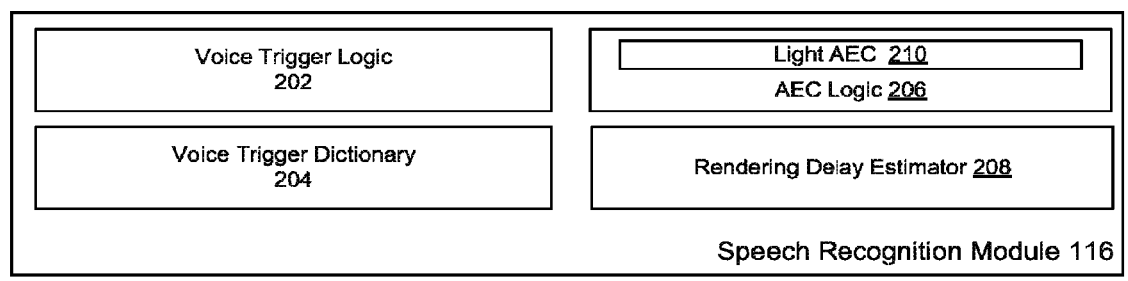
FIG. 2 depicts an illustrative speech recognition module configured to implement some embodiments of the present disclosure.

FIG. 2 depicts an illustrative speech recognition module 116 configured to implement some embodiments of the present disclosure. Speech recognition module 116 may be comprised of voice trigger logic 202, voice trigger dictionary 204, acoustic echo cancellation (AEC) logic 206 and rendering delay estimator 208. Each of these components may be implemented in hardware, software, or any combination thereof.

Voice trigger logic 202 may be configured to process audio samples received from a microphone, such as the microphones depicted in blocks 124 and 128 of FIG. 1. Voice trigger logic 202 may also be configured to detect one or more pre-defined voice commands, or voice triggers, in the processed audio samples and may initiate an action upon detection of the one or more voice commands. As used herein, a voice trigger may be a subset of possible voice commands, or special key phrases, that may be processed by voice trigger logic 202 of DSP 120 of FIG. 1. In embodiments, a voice trigger may be utilized by a user to initiate further voice command processing. For example, a voice trigger, such as "hello assistant" may be utilized to cause DSP 120 to initiate or activate CUI 112 and route audio, via audio mixer and router 118 of FIG. 1, to CUI 112. Voice trigger logic 202 may be configured to continuously monitor for a voice trigger, while other voice commands may only be processed while another application is active, such as CUI 112.

In embodiments, the one or more voice triggers may be stored in voice trigger dictionary 204 and voice trigger logic 202 may load, or otherwise access, possible voice triggers from voice trigger dictionary 204. In some embodiments, voice trigger dictionary 204 may be configured to enable different, or additional, voice triggers depending upon a current context of a mobile phone which speech recognition module 116 is a part of, such as mobile phone 100 of FIGS. 1 and 3. For example, if the mobile phone is being used for music playback, voice trigger dictionary 204 may enable voice triggers such as 'stop music,' 'pause music,' 'play music,' etc. When the mobile phone is not being used for music playback these commands may not be enabled by voice trigger dictionary 204. It will be appreciated that this example is meant to be illustrative and that any such type of context sensitive speech recognition is contemplated.

In some embodiments, the context sensitive speech recognition may be utilized while the mobile phone is in a low power mode. For instance, the mobile phone may be capable of music playback while in a low power mode, and may only supply power to a subset of components to enable the music playback, while conserving battery life. In these instances, voice trigger logic 202 may be configured to restrict the processing to only voice triggers associated with that context. This may enable voice trigger logic 202 to consume less energy by only monitoring for a small subset of possible voice commands. In some embodiments, voice trigger logic 202 may be configured to process contextual background audio information. For example, in a scenario where a user is listening to music, voice trigger logic 202 may be configured to pause or stop music playback when it detects the sound of, for example, a doorbell or of a baby crying. These examples are meant to be merely illustrative and are not meant to be limiting.

To aid in detecting the voice triggers in the audio samples, a first echo cancellation logic, AEC Logic 206, may be employed to attenuate audio originating from the mobile phone. For instance, in the music playback scenario discussed above, the mobile phone may employ AEC Logic 206 to attenuate the music output by the mobile phone from the audio sampling captured by a microphone of the mobile phone. This attenuation may enable better detection of voice commands in the audio sampling. Operating AEC Logic 206 in a high powered mode, however, may decrease the benefits of operating the mobile phone in a low power mode. AEC technology may be computationally intensive and therefore may not be suitable for low power implementations. To remedy this, a second echo cancellation logic, lightweight AEC (light AEC) 210, may be selectively employed when the phone is in a low power mode while regular full powered AEC may be selectively employed when the mobile phone is in a normal power mode.

As depicted herein, light AEC 210 may be a subcomponent of AEC logic 206. It will be appreciated, however, that other configurations may be utilized without departing from the scope of this disclosure. For instance light AEC 210 may be implemented separately from AEC logic 206. In some embodiments, light AEC 210 may be implemented without implementation of AEC logic 206. Furthermore, when implemented as a subcomponent of AEC logic 206, light AEC 210 may employ a subset of the functionality of AEC logic 206 and/or functionality separate from that of AEC logic 206.

When the mobile phone is in a low power mode, such as the low power mode described above, the light AEC 210 may be possible because the audio captured by the microphone may not be output for human consumption. Because the audio captured by the microphone may not be output for human consumption, the quality of the AEC may be reduced and still be effective. In addition, the concern about audio loop-backs, where audio captured by a microphone is looped back through the speakers, is no longer present. As a result, light AEC 210 may be simplified in two ways that may conserve energy.

First, light AEC 210 may operate an AEC adaptive filter, not depicted, at a lower sampling frequency rate than AEC logic 206 would operate the adaptive filter at. Of note is that the complexity of adaptive filter calculations scale quadratically with respect to the operating frequency. As a result, while AEC logic 206 may operate at a frequency of approximately 16 kHz, for example, light AEC 210 may operate at a frequency of approximately 4 kHz. Operating the AEC at 4 kHz as opposed to 16 kHz results in a 4× frequency reduction, but more importantly it may result in approximately a 16× reduction in computations. These reductions in frequency and computation correspondingly result in a reduction in energy consumption. It will be appreciated that the frequencies chosen for the examples above are merely meant for illustration and that any appropriate frequencies may be selected.

Second, AEC modules may include two computational blocks, a linear adaptive filter, such as that discussed above, and a non-linear processing (NLP) block. In embodiments, AEC logic 206 may need to achieve a much higher level of echo suppression to prevent audio loop-backs. As discussed above, audio loop-backs may no longer be of concern when the mobile phone is operating in a low power mode. As a result, the light AEC 210 may forgo the NLP block because the linear adaptive filter may be capable of sufficient echo suppression on its own.

These two simplifications may be implemented in concert or individually depending upon the specific application. Either simplification may achieve a reduction in power over AEC logic 206. In addition, the light AEC 210 need not be restricted solely to use while the mobile phone is in a low power mode. It will be appreciated that in any scenario where the audio captured by the microphone is not output by the speaker the light AEC 210 may be implemented to conserve power and prolong battery life of the mobile phone.

Another aspect that may be implemented in speech recognition module 116 is rendering delay estimator 208. In embodiments, where the microphone and speaker are both on-board the mobile phone, the delay between the mobile phone producing the audio stream and the speaker rendering the audio stream may be relatively static and relatively short and the AEC logic 206 may be able to compensate for a small variance. However, in situations where the microphone and speaker may be located in different enclosures, such as where a speaker may be coupled with external audio interface 122 of FIG. 1, the delay between when the mobile phone produces the audio stream and when the audio stream is rendered by the external, or remote, speaker is unknown and may be significant. This delay may be considered a rendering delay. This scenario may occur, for example, where the on-board microphone of the mobile phone is utilized to monitor for voice commands and/or voice triggers but the mobile phone plays music through external speakers, such as car speakers. In these scenarios the rendering delay may vary depending upon the mode of connection with the external speaker and the architecture of the external speaker itself.

In order to account for possible variations in rendering delay, rendering delay estimator 208 may be configured to determine an amount of time between when an audio stream is processed by the phone and when a microphone of the phone receives the audio as input. This may be accomplished by providing rendering delay estimator 208 with an audio stream reference sample and an audio stream from the microphone. Rendering delay estimator 208 may then cross-correlate the reference sample with the audio stream from the microphone and determine the rendering delay. Because the rendering delay may vary with time, in some embodiments, it may be necessary to perform several cross-correlations before an accurate estimation of the rendering delay may be calculated. In these embodiments, the results of the cross-correlations may be consolidated and statistical signal processing techniques may be applied by rendering delay estimator 208 to obtain an accurate rendering delay estimation. In embodiments, the rendering delay estimation may then be provided to AEC logic 206 and/or Light AEC 210 to be utilized in fine tuning the echo cancellation.

Figure 3:
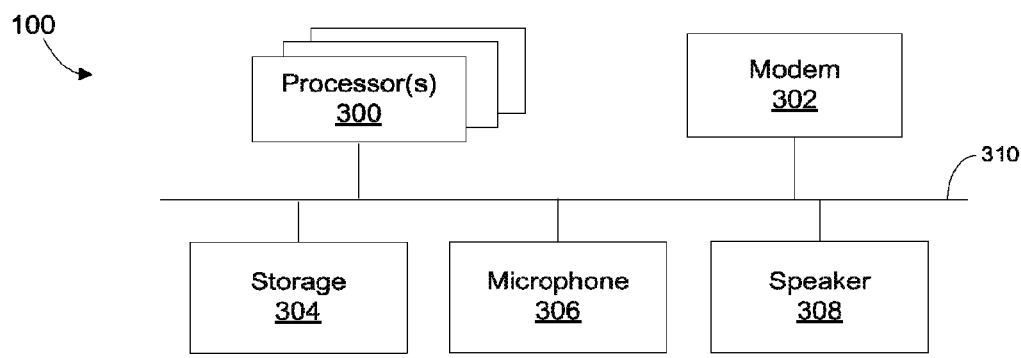
FIG. 3 depicts an illustrative hardware representation of a mobile phone in which some embodiments of the present disclosure may be implemented.

FIG. 3 depicts an illustrative configuration of mobile phone 100 according to some embodiments of the disclosure. Mobile phone 100 may comprise processor(s) 300, modem 126, storage 304, microphone 306 and speaker 308. Processor(s) 300, modem 126, storage 304 microphone 306 and speaker 308 may be coupled together utilizing system bus 310.

Processor(s) 300 may, in some embodiments, be a single processor or, in other embodiments, may be comprised of multiple processors. In some embodiments the multiple processors may be of the same type, i.e. homogeneous, or they may be of differing types, i.e. heterogeneous and may include any type of single or multi-core processors. This disclosure is equally applicable regardless of type and/or number of processors.

In embodiments, modem 126 may be configured to enable mobile phone 100 to access a network, such as a wireless communication network. Wireless communication networks may include, but are not limited to, wireless cellular networks, satellite phone networks, internet protocol (IP) telephony networks, and WiFi networks.

In embodiments, storage 304 may be any type of computer-readable storage medium or any combination of differing types of computer-readable storage media. For example, in embodiments, storage 304 may include, but is not limited to, a solid state drive (SSD), a magnetic or optical disk hard drive, volatile or non-volatile memory, dynamic or static random access memory, flash memory, or any multiple or combination thereof. In embodiments, storage 304 may store instructions which, when executed by processor(s) 300, cause mobile phone 100 to perform one or more operations of the process described in reference to FIG. 4, below, or any other processes described herein.

Figure 4:
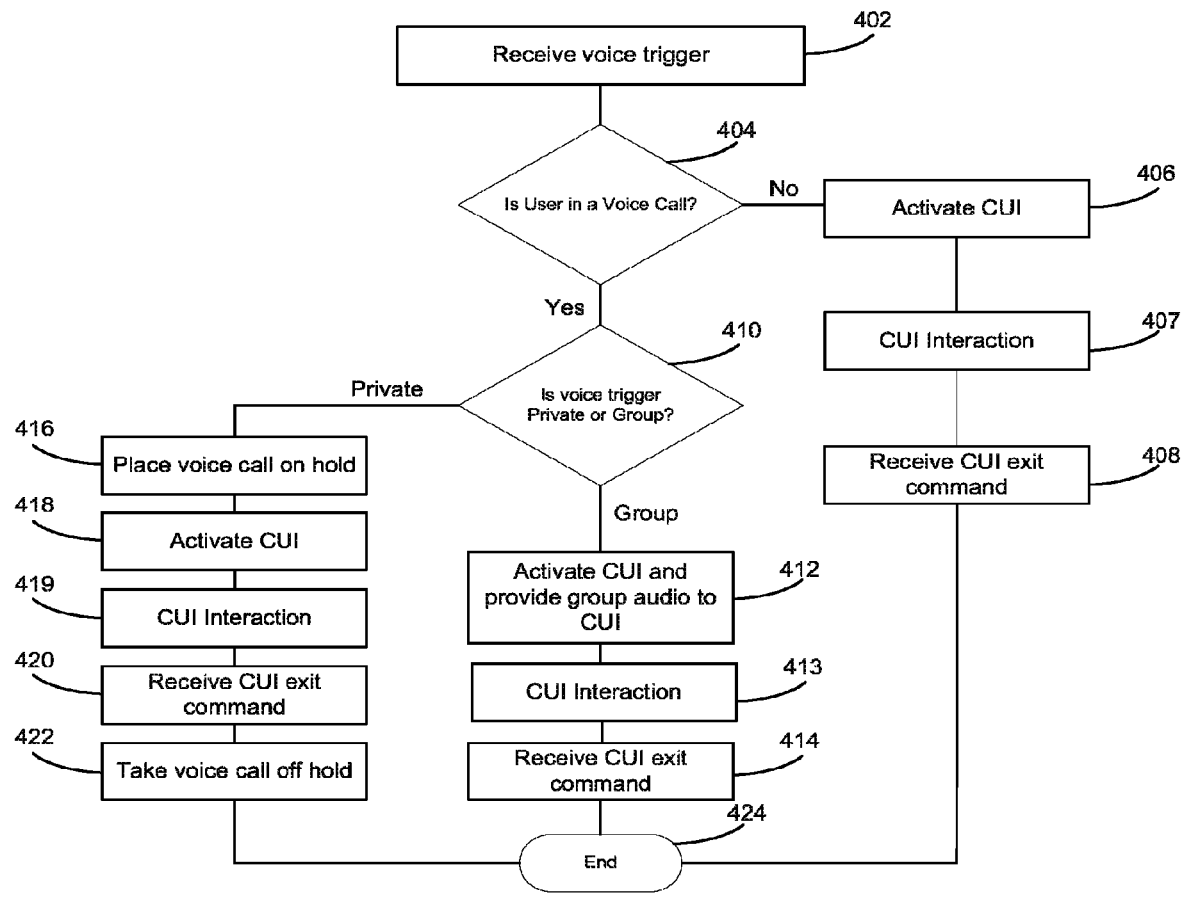
FIG. 4 depicts an illustrative process flow according to some embodiments of the present disclosure.

FIG. 4 depicts an illustrative process flow according to some embodiments of the present disclosure. The process may begin at block 402 where a voice trigger may be received by a speech recognition module, such as speech recognition module 116, of FIGS. 1 and 2. The voice trigger may be received by speech recognition module through either internal audio components 124 or external audio components 128 of FIG. 1. At block 404 the speech recognition module may, in some embodiments, determine if the user is currently participating in a voice call. In other embodiments, not depicted here, it may not be necessary to determine if the user is participating in a call and block 404 may be skipped in such embodiments. If the user is not currently participating in a voice call then the process moves to block 406 where the CUI, such as CUI 112 of FIG. 1, is activated. In some embodiments, the CUI may be activated by routing an audio stream to the CUI, as discussed above in reference to FIG. 1. In block 407, the user may interact with the CUI by giving the CUI voice commands and receiving responses to those voice commands from the CUI. After the user is finished interacting with the CUI, the speech recognition module may receive an exit command in block 408 to exit the CUI, such as, for example, the user saying "bye assistant," which may deactivate the CUI. In some embodiments, the CUI may be deactivated by simply stopping the audio stream provided to the CUI. The process may then move on to block 424 where the process ends.

Returning to block 404, if the user is participating in a voice call then the process may proceed to block 410 where the speech recognition module may determine whether the voice trigger received is associated with a private or group mode of the CUI. If the command received is associated with a group mode, then the speech recognition module may activate the CUI and provide the group audio to the CUI in block 412. The group audio may be provided to the CUI by, for example, utilizing an audio mixer and router, such as 118 of FIG. 1, to mix an audio stream coming from a modem, such as 126 of FIGS. 1 and 3, and an audio stream coming from one or more internal or external audio components, such as 124 and 128 of FIG. 1, respectively. As discussed above in reference to FIG. 1, this audio stream may be provided directly by the audio mixer and router or the audio stream may be processed by the speech recognition module prior to being forwarded to the CUI. In block 413, the user may interact with the CUI by giving the CUI voice commands and receiving responses to those voice commands from the CUI. After the user is finished interacting with the CUI, the speech recognition module may receive an exit command in block 414 to exit the CUI which may deactivate the CUI. In some embodiments, not depicted here, the user may be able to switch back and forth between private mode and group mode while interacting with the CUI via voice commands and/or voice triggers.

While in group mode, the user and other participant(s) of the voice call may provide commands to the CUI. In some embodiments, the group mode may allow the other participants of the voice call to talk with the user while the user is interacting with the CUI and to listen to the user's interaction with the CUI, but the participants may not be allowed to interact with the CUI directly. In these embodiments, only the audio of the user may be provided to the CUI or the CUI may be able to identify the user's voice and may only respond to commands from the user while ignoring any commands that a participant may give to the CUI.

The group mode may be beneficial, for instance, where the user needs input from the participants of the voice call during the user's interaction with the CUI. For example, the user may be scheduling a meeting with the participants of the voice call via voice commands and may wish to interact with the participants while accessing the user's calendar to determine an appropriate day and time for the meeting. In another example, the participants and the user may be discussing an email received by the user and the user may wish to have the CUI access the email via voice commands and have the other participants involved in this interaction. These examples are merely presented for illustrative purposes and are not meant to be limiting of this disclosure. It will be appreciated that there are many scenarios in which the user may wish to have the participants of the voice call participate in the interaction with the CUI and this disclosure is equally applicable to any such scenario. Once the user has finished interacting with the CUI the user may give a voice trigger to the speech recognition module to exit the CUI and the CUI session may terminate. After the CUI session terminates, the process may end at block 424.

Returning to block 410, if it is determined that the voice trigger is a private voice trigger the process may proceed to block 416 where the voice call is placed on hold. At block 418 the CUI is activated and the user may interact with the CUI while the voice call remains on hold. In block 419, the user may interact with the CUI by giving the CUI voice commands and receiving responses to those voice commands from the CUI. Once the user has finished interacting with the CUI the user may give an exit command in block 420 to the speech recognition module to exit the CUI and the CUI session may terminate. After the CUI session terminates, the voice call may be taken off hold at block 422 and the process may end at block 424.

While the detailed description above has been directed towards voice calls, it will be appreciated that this disclosure is equally applicable to video calls. For instance, this disclosure is equally applicable if the user is utilizing an application such as Skype or Facetime to conduct a video call, rather than a voice call.

For the purposes of this description, a computer-usable or computer-readable medium can be any medium that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk-read/write (CD-R/W) and DVD.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

Below are some non-limiting examples.

Example 1 is a mobile phone comprising: a processor; and a speech recognition module coupled with the processor, wherein the speech recognition module is configured to recognize one or more voice commands and includes first echo cancellation logic and second echo cancellation logic to be selectively employed during recognition of voice commands, and wherein employment of the first and second echo cancellation logic respectively cause the mobile phone to variably consume first and second amount of energy, with the second amount of energy being less than the first amount energy.

Example 2 may include the subject matter of Example 1, wherein the first and second echo cancellation logic are respectively configured to operate at first and second sampling rate, with the second sampling rate being a lower sampling rate than the first sampling rate.

Example 3 may include the subject matter of Example 1, wherein the first echo cancellation logic includes non-linear processing logic and the second echo cancellation logic omits the non-linear processing logic.

Example 4 may include the subject matter of Example 1, wherein the speech recognition module is further configured to determine a rendering delay between when an audio stream is processed by the mobile phone and when the audio stream is rendered by a remote speaker coupled with the mobile phone; wherein the first and second echo cancellation logic are configured to incorporate the rendering delay into one or more calculations.

Example 5 may include the subject matter of any one of Examples 1-3, wherein the speech recognition module is configured to employ the second echo cancellation logic, while the mobile phone is in a low power state.

Example 6 may include the subject matter of any one of Examples 1-3, wherein the mobile phone further comprises a speaker and a microphone, wherein the speech recognition module is further coupled with both the speaker and the microphone, and configured to employ the second echo cancellation logic whenever the speaker is not outputting audio contemporaneously captured by the microphone.

Example 7 may include the subject matter of any one of Examples 1-3, wherein the speech recognition module is further configured to selectively initiate a private mode or a group mode of a conversational user interface (CUI) of the mobile phone in response to a first voice command or a second voice command, respectively, while the user is engaged in a voice or video call with one or more participants using the mobile phone.

Example 8 may include the subject matter of Example 7, wherein the private mode is configured to exclude the one or more participants from interaction with the CUI, and the group mode is configured to include the one or more participants, as well as the user, in interaction with the CUI.

Example 9 may include the subject matter of Example 7, wherein the first and second voice commands comprise a first and second voice trigger, respectively.

Example 10 is a computer-implemented method for initiating a conversational user interface (CUI) comprising: receiving, by a speech recognition module of a mobile phone, a voice command from a user of the mobile phone, while the user is in a voice or video call with one or more participants; determining, by the speech recognition module, if the voice command is associated with a private mode or a group mode of a CUI; and initiating, by the speech recognition module, the CUI in either the private mode or the group mode based upon the result of the determining.

Example 11 may include the subject matter of Example 10, wherein initiating the CUI in either the private mode or the group mode further comprises excluding the one or more participants from the user's interaction with the CUI or including the one or more participants from the user's interaction with the CUI, respectively.

Example 12 may include the subject matter of Example 10, further comprising, selectively employing first and second echo cancellation logic wherein the first and second echo cancellation logic respectively cause the mobile phone to consume first and second amount of energy, with the second amount of energy being less than the first amount energy.

Example 13 may include the subject matter of Example 12, wherein the first and second echo cancellation logic respectively operate at a first and second sampling rate, with the second sampling rate being a lower sampling rate than the first sampling rate.

Example 14 may include the subject matter of Example 12, wherein the first echo cancellation logic includes non-linear processing logic and the second echo cancellation logic omits the non-linear processing logic.

Example 15 may include the subject matter of Example 12, further comprising: determining, by the speech recognition module, a rendering delay between when an audio stream is processed by the mobile phone and when the audio stream is rendered by a remote speaker coupled with the mobile phone; and incorporating the rendering delay into first and second echo cancellation logic.

Example 16 may include the subject matter of any one of Examples 12-14, further comprising employing the second echo cancellation logic, while the mobile phone is in a low power state.

Example 17 may include the subject matter of any one of Examples 12-14, further comprising employing the second echo cancellation logic whenever a speaker of the mobile phone is not outputting audio contemporaneously captured by a microphone of the mobile phone.

Example 18 may include the subject matter of any one of Examples 10-15, wherein the voice command comprises a voice trigger.

Example 19 is one or more computer-readable media having instructions stored thereon which, when executed by a mobile phone provide the mobile phone with a speech recognition module configured to: selectively initiate a private mode of a conversational user interface (CUI) in response to a first voice command or initiate a group mode of the CUI in response to a second voice command, while the user is engaged in a voice or video call with one or more participants using the mobile phone; and selectively employ first echo cancellation logic and second echo cancellation logic, wherein employment of the first and second echo cancellation logic respectively cause the mobile phone to consume a first and second amount of energy, with the second amount of energy being less than the first amount energy.

Example 20 may include the subject matter of Example 19, wherein the private mode excludes the one or more participants from interaction with the CUI and the group mode includes the one or more participants, as well as the user, in interaction with the CUI.

Example 21 may include the subject matter of Example 19, wherein the first and second echo cancellation logic respectively operate at first and second sampling rate, with the second sampling rate being a lower sampling rate than the first sampling rate.

Example 22 may include the subject matter of Example 21, wherein the first echo cancellation logic includes non-linear processing logic and the second echo cancellation logic omits the non-linear processing logic.

Example 23 may include the subject matter of Example 19, wherein the speech recognition module is further configured to determine a rendering delay between when an audio stream is processed by the mobile phone and when the audio stream is rendered by a remote speaker coupled with the mobile phone; wherein the first and second echo cancellation logic is configured to incorporate the rendering delay into one or more calculations.

Example 24 may include the subject matter of any one of Examples 19-22, wherein the speech recognition module is further configured to employ the second echo cancellation logic, while the mobile phone is in a low power state.

Example 25 may include the subject matter of any one of claims 19-23, wherein the first and second commands comprise first and second voice triggers respectively.

Example 26 is a mobile phone comprising: means for selectively initiating a private mode of a conversational user interface (CUI) in response to a first voice command or initiating a group mode of the CUI in response to a second voice command, while the user is engaged in a voice or video call with one or more participants using the mobile phone; and means for selectively employing first echo cancellation logic and second echo cancellation logic, wherein employing the first and second echo cancellation logic respectively cause the mobile phone to consume a first and second amount of energy, with the second amount of energy being less than the first amount energy.

Example 27 may include the subject matter of Example 26, wherein the private mode excludes the one or more participants from interaction with the CUI and the group mode includes the one or more participants, as well as the user, in interaction with the CUI.

Example 28 may include the subject matter of Example 26, wherein the first and second echo cancellation logic respectively operate at first and second sampling rate, with the second sampling rate being a lower sampling rate than the first sampling rate.

Example 29 may include the subject matter of Example 28, wherein the first echo cancellation logic includes non-linear processing logic and the second echo cancellation logic omits the non-linear processing logic.

Example 30 may include the subject matter of Example 26, further comprising means for determining a rendering delay between when an audio stream is processed by the mobile phone and when the audio stream is rendered by a remote speaker coupled with the mobile phone; wherein the first and second echo cancellation logic is configured to incorporate the rendering delay into one or more calculations.

Example 31 may include the subject matter of any one of Examples 26-29, further comprising means for employing the second echo cancellation logic, while the mobile phone is in a low power state.

Example 32 may include the subject matter of any one of Examples 26-31, wherein the first and second commands comprise first and second voice triggers respectively.

Example 33 is one or more computer-readable media having instructions stored thereon which, when executed by a mobile phone cause the mobile phone to perform the method of any one of Examples 10-15.

Example 34 is a mobile phone comprising means for performing the method of any one of Examples 10-15.

What is claimed is:

1. A mobile phone comprising:
    a processor; and
    a speech recognition module coupled with the processor, wherein the speech recognition module is to recognize one or more voice commands and includes first echo cancellation logic and second echo cancellation logic to be selectively employed, either the first echo cancellation logic or the second echo cancellation logic, during recognition of voice commands, and wherein employment of the first echo cancellation logic causes the mobile phone to consume a first amount of energy to recognize a first of the one or more voice commands, and employment of the second echo cancellation logic causes the mobile phone to consume a second amount of energy to recognize the first command, with the second amount of energy being less than the first amount energy.

2. The mobile phone of claim 1, wherein the first and second echo cancellation logic are to respectively operate at first and second sampling rate, with the second sampling rate being a lower sampling rate than the first sampling rate.

3. The mobile phone of claim 1, wherein the first echo cancellation logic includes non-linear processing logic and the second echo cancellation logic omits the non-linear processing logic.

4. The mobile phone of claim 1, wherein the speech recognition module is to further determine a rendering delay between when an audio stream is processed by the mobile phone and when the audio stream is rendered by a remote speaker coupled with the mobile phone; wherein the first and second echo cancellation logic are to incorporate the rendering delay into one or more calculations.

5. The mobile phone of claim 1, wherein the speech recognition module is to employ the second echo cancellation logic, while the mobile phone is in a low power state.

6. The mobile phone of claim 1, wherein the mobile phone further comprises a speaker and a microphone, wherein the speech recognition module is further coupled with both the speaker and the microphone, and to employ the second echo cancellation logic whenever the speaker is not outputting audio contemporaneously captured by the microphone.

7. The mobile phone of claim 1, wherein the speech recognition module is to further selectively initiate a private mode or a group mode of a conversational user interface (CUI) of the mobile phone; wherein the speech recognition module is to initiate the private mode CUI in response to a voice trigger, while the user has placed a voice call on hold, and the speech recognition module is to initiate the group mode CUI in response to the voice trigger, while the user is engaged in a video call with one or more participants.

8. The mobile phone of claim 7, wherein the private mode CUI is to receive commands from the user, and exclude the one or more participants from interaction with the CUI, and the group mode CUI is to receive commands from any of the one or more participants, as well as the user, in interaction with the CUI.

9. One or more non-transitory computer-readable media having instructions stored thereon which, when executed by a mobile phone provide the mobile phone with a speech recognition module to:
   receive a voice trigger;
   determine whether the voice trigger is received while the user has placed a voice call on hold, or while the user is engaged in a video call with one or more participants;
   initiate a private mode of a conversational user interface (CUI), having the private mode and a group mode of operation, if a result of the determination indicates the voice trigger is received while the user has placed a voice call on hold; and
   initiate the group mode of the CUI if a result of the determination indicates the voice trigger is received while the user is engaged in a video call with one or more participants.

10. The one or more non-transitory computer-readable media of claim 9, wherein the private mode CUI is to receive commands from the user, and exclude the one or more participants from interaction with the private mode CUI, and the group mode CUI is to receive commands from any one of the one or more participants and the user to interact with the group mode CUI.

11. The one or more computer-readable media of claim 9, further comprising, selective employment of one of first and second echo cancellation logic wherein the first and second echo cancellation logic respectively cause the mobile phone to consume first and second amount of energy to recognize a command, with the second amount of energy being less than the first amount energy.

12. The one or more computer-readable media of claim 11, wherein the first and second echo cancellation logic are to respectively operate at a first and second sampling rate, with the second sampling rate being a lower sampling rate than the first sampling rate.

13. The one or more non-transitory computer-readable media of claim 11, wherein the first echo cancellation logic includes non-linear processing logic and the second echo cancellation logic omits the non-linear processing logic.

14. The one or more non-transitory computer-readable media of claim 11, wherein the speech recognition module is to further:
   determine a rendering delay between when an audio stream is processed by the mobile phone and when the audio stream is rendered by a remote speaker coupled with the mobile phone; and
   incorporate the rendering delay into first and second echo cancellation logic.

15. The one or more non-transitory computer-readable media of claim 11, wherein the speech recognition module is to further employ the second echo cancellation logic, while the mobile phone is in a low power state.

16. The one or more non-transitory computer-readable media of claim 11, wherein the speech recognition module is to further employ the second echo cancellation logic whenever a speaker of the mobile phone is not outputting audio contemporaneously captured by a microphone of the mobile phone.

17. A computer-implemented method comprising:
   initiating, by a speech recognition module of a mobile phone, a private mode of a conversational user interface (CUI), having the private mode and a group mode of operation, in response to a voice trigger, while a user of the mobile phone has placed a voice call on hold, or initiating the group mode of the CUI in response to the voice trigger, while the user is engaged in a video call with one or more participants; and
   selectively employing, by the speech recognition module, one of first echo cancellation logic and second echo cancellation logic to recognize a command, wherein employment of the first and second echo cancellation logic to recognize the command respectively cause the mobile phone to consume a first and second amount of energy, with the second amount of energy being less than the first amount energy.

18. The computer-implemented method of claim 17, wherein the private mode CUI is to receive commands from the user and excludes the one or more participants from interaction with the private mode CUI, and the group mode CUI is to received commands from any of the one or more participants, as well as the user, in interaction with the group mode CUI.

19. The computer-implemented method of claim 17, wherein the first and second echo cancellation logic respectively operate at first and second sampling rate, with the second sampling rate being a lower sampling rate than the first sampling rate.

20. The computer-implemented method of claim 19, wherein the first echo cancellation logic includes non-linear processing logic and the second echo cancellation logic omits the non-linear processing logic.

21. The computer-implemented method of claim 17, further comprising determining a rendering delay between when an audio stream is processed by the mobile phone and when the audio stream is rendered by a remote speaker coupled with the mobile phone; wherein the first and second echo cancellation logic is to incorporate the rendering delay into one or more calculations.

22. The computer-implemented method of claim 17, further comprising employing the second echo cancellation logic, while the mobile phone is in a low power state.

* * * * *